(12) United States Patent
Kim et al.

(10) Patent No.: US 9,174,594 B2
(45) Date of Patent: Nov. 3, 2015

(54) CRASH BOX FOR VEHICLE

(71) Applicant: Hyundai Motor Company, Seoul (KR)

(72) Inventors: Hyun Gyung Kim, Hwaseong-si (KR); Phil Jung Jeong, Yongin-si (KR); Seung Mok Lee, Osan-si (KR); Dong Eun Cha, Suwon-si (KR); Dong Hak Kim, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/548,712

(22) Filed: Nov. 20, 2014

(65) Prior Publication Data

US 2015/0217709 A1    Aug. 6, 2015

(30) Foreign Application Priority Data

Feb. 6, 2014    (KR) .................. 10-2014-0013500

(51) Int. Cl.
  *B60R 19/34*    (2006.01)
(52) U.S. Cl.
  CPC ..................... *B60R 19/34* (2013.01)
(58) Field of Classification Search
  CPC .. B60R 19/34; B60R 19/18; B60R 2019/186; B62D 21/152; B62D 25/08; Y10T 29/49622; F16F 7/12
  USPC .......................... 293/133, 155, 132
  See application file for complete search history.

(56) References Cited

U.S. PATENT DOCUMENTS

| | | | |
|---|---|---|---|
| 2006/0202493 A1* | 9/2006 | Tamura et al. | 293/133 |
| 2006/0249962 A1* | 11/2006 | Gonzalez et al. | 293/133 |
| 2006/0290150 A1* | 12/2006 | Roll et al. | 293/133 |
| 2007/0182176 A1* | 8/2007 | Muskos | 293/133 |
| 2008/0030031 A1* | 2/2008 | Nilsson | 293/133 |
| 2008/0217935 A1* | 9/2008 | Braunbeck et al. | 293/132 |
| 2008/0224487 A1* | 9/2008 | Wang et al. | 293/132 |
| 2009/0001737 A1* | 1/2009 | Salomonsson | 293/133 |
| 2009/0115208 A1* | 5/2009 | Kano et al. | 293/132 |
| 2009/0243312 A1* | 10/2009 | Handing et al. | 293/132 |
| 2009/0243313 A1* | 10/2009 | Handing et al. | 293/133 |
| 2009/0302624 A1* | 12/2009 | Zielke | 293/132 |
| 2010/0066124 A1* | 3/2010 | Terada et al. | 296/187.09 |
| 2010/0148526 A1* | 6/2010 | Karlander | 293/155 |
| 2010/0164238 A1* | 7/2010 | Nakanishi et al. | 293/132 |

(Continued)

FOREIGN PATENT DOCUMENTS

| | | | |
|---|---|---|---|
| JP | 2009-274635 A | 11/2009 | |
| JP | 2010-6193 A | 1/2010 | |

(Continued)

*Primary Examiner* — Kiran B Patel
(74) *Attorney, Agent, or Firm* — Morgan, Lewis & Bockius LLP

(57) ABSTRACT

A crash box for a vehicle may include a first plate having a middle end formed with a cylindrical first flange protruding in one direction, a second plate having a middle end formed with a cylindrical second flange protruding in another direction, a pipe having each of both ends coupled to the corresponding first and second flanges respectively, and an impact absorbing device configured to absorb an impact while the first flange and the pipe matched with each other through the impact absorbing device may be shear-deformed at a time of crash by pressing an overlapping portion of the first flange and one end of the pipe to deform shapes of a pressed portion of the first flange and the pipe into shapes matched with each other.

11 Claims, 3 Drawing Sheets

(56) References Cited

U.S. PATENT DOCUMENTS

| | | | |
|---|---|---|---|
| 2011/0187135 A1* | 8/2011 | Kano et al. .................... | 293/133 |
| 2011/0291431 A1* | 12/2011 | Buschsieweke et al. ..... | 293/133 |
| 2012/0025547 A1* | 2/2012 | Haneda et al. ................ | 293/133 |
| 2012/0139273 A1* | 6/2012 | Jeong et al. ................... | 293/132 |
| 2012/0146348 A1* | 6/2012 | Di Modugno ................ | 293/133 |
| 2013/0001964 A1* | 1/2013 | Freundl et al. ................ | 293/133 |
| 2013/0076051 A1* | 3/2013 | Baldwin ....................... | 293/133 |

FOREIGN PATENT DOCUMENTS

| | | |
|---|---|---|
| JP | 5168477 B2 | 1/2013 |
| KR | 10-2007-0055014 A | 5/2007 |
| KR | 10-2009-0112796 A | 10/2009 |
| KR | 10-2011-0023469 A | 3/2011 |
| KR | 10-1087981 B1 | 12/2011 |
| KR | 10-1251299 B1 | 4/2013 |

* cited by examiner

CRASH BOX FOR VEHICLE

CROSS REFERENCE TO RELATED APPLICATION

The present application claims priority to Korean Patent Application No. 10-2014-0013500, filed Feb. 6, 2014, the entire contents of which is incorporated herein for all purposes by this reference.

BACKGROUND OF THE INVENTION

1. Field of the Invention

The present invention relates to a crash box for a vehicle, and more particularly, to a crash box for a vehicle capable of increasing the absorption of crash energy by a molding structure of the crash box by matching, deformation, and welding of a flange and a pipe and reducing the cost and weight of a product by reducing the number of parts.

2. Description of Related Art

A bumper serves to buffer crash energy generated at the time of a crash of vehicles and as illustrated in FIG. 1, is configured to include a bumper stay 11 which is coupled to a vehicle body, a back beam 12 which is coupled to the bumper stay 11, an absorber 13 which is coupled to a front surface of the back beam 12 to absorb crash energy, and a bumper cover 14 which is coupled to the vehicle body in a form enclosing the absorber 13 from being exposed to the outside.

Further, a crash box 30 is mounted between the back beam 12 and a side member to absorb the crash energy at the time of low-speed crash, thereby minimizing a damage of parts of a vehicle and providing for the safety of passengers.

The crash box 30 has a square box structure of which the inside is empty and is configured to absorb the crash energy while the box structure collapses at the time of the occurrence of accidents.

As the typical crash box, a crash box structure filled with a foam member to increase absorption efficiency of crash energy, a crash box structure absorbing crash energy in such a manner that a plurality of squared axis pipes are coupled with each other, and the like have been proposed; however, these crash box structures have a disadvantage in that cost and weight are increased due to the increased number of parts, energy deforming a vehicle body is excessively present, and absorption efficiency of crash energy is small.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed providing a crash box for a vehicle capable of increasing absorption of crash energy by a molding structure of the crash box by matching, deformation, and welding of a flange and a pipe and reducing cost and weight of a product by reducing the number of parts.

In an aspect of the present invention, a crash box for a vehicle, may include a first plate having a middle end formed with a cylindrical first flange protruding in one direction, a second plate having a middle end formed with a cylindrical second flange protruding in another direction, a pipe having each of both ends coupled to the corresponding first and second flanges respectively, and an impact absorbing device configured to absorb an impact while the first flange and the pipe matched with each other through the impact absorbing device are shear-deformed at a time of crash by pressing an overlapping portion of the first flange and one end of the pipe to deform shapes of a pressed portion of the first flange and the pipe into shapes matched with each other.

The first flange and the second flange are each protrudedly formed at middle ends of the first plate and the second plate by burring and the middle ends of the first plate and the second plate may have a perforated shape.

An inner surface of the first flange is overlappingly coupled to an outer surface of the one end of the pipe, and an outer surface of the second flange is overlappingly coupled to an inner surface of another end of the pipe.

The first flange, the second flange, and the pipe each may have a section in a circular shape or an oval shape.

The impact absorbing device may include an embossing formed on the one end of the pipe and an end of the first flange is matched with the embossing of the pipe such that the impact absorbing device presses a portion of the first flange overlapped with the embodying, along a circumferential direction of the first flange and thus the first flange and the one end of the pipe of the pressed portion are deformed while being matched to each other through the embossing.

The embossing protrudes in an axial direction of the pipe.

An overlapping length of the first flange and the one end of the pipe is set to be about 70% of a length of the first flange protruding from the middle end of the first plate.

The first flange and the one end of the pipe are joined by welding.

The flange is welded to plural places along a circumferential direction of a tip portion of the one end of the pipe.

The welding is made by controlling the number of welded portions so that a fracture load of a welded portion is larger than a shear deformation load by which the first flange and the pipe are shear-deformed.

An outer surface of the first flange is overlappingly coupled to an inner surface of the one end of the pipe, and an inner surface of the second flange is overlappingly coupled to an outer surface of another end of the pipe.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
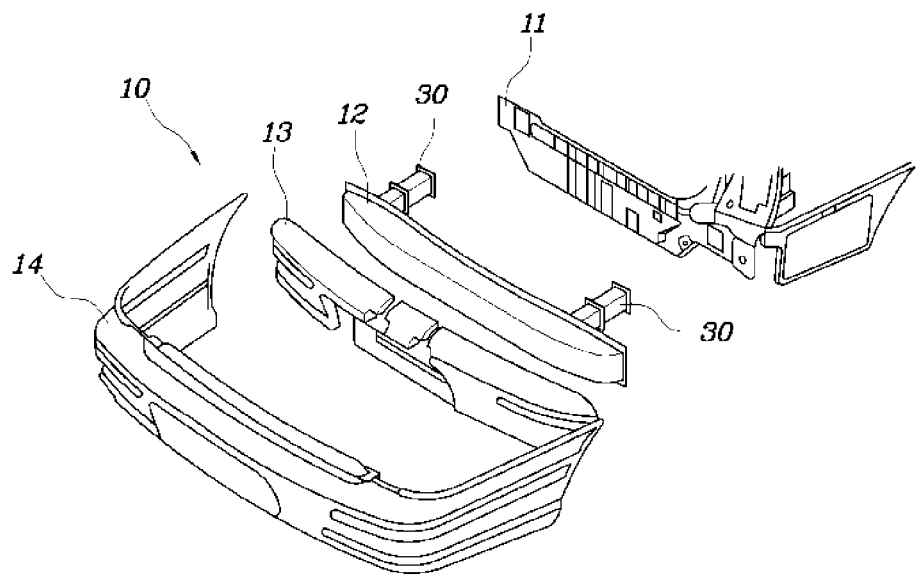
FIG. 1 is an exploded view for describing a coupling structure of a crash box inside the existing bumper for a vehicle according to the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The crash box for a vehicle according to an exemplary embodiment of the present invention may include a first plate 100, a second plate 200, a pipe 300, and an impact absorbing device.

Describing in detail the present invention with reference to FIGS. 2 to 4B, the crash box for the vehicle includes the first plate 100 having a middle end formed with a cylindrical first flange 110 protruding in one direction, the second plate 200 having a middle end formed with a cylindrical second flange 210 protruding in another direction, the pipe 300 having both one end and another end coupled to the first flange 110 and the second flange 210 respectively, and the impact absorbing device configured to absorb an impact while the first flange 110 and the pipe 300 matched with each other at the time of crash are shear-deformed by pressing an overlapping portion of the first flange 110 and one end of the pipe 300 to deform a shape of the pressed portion of the first flange 110 and the pipe 300 in a shape matched with each other.

In this configuration, the first flange 110 and one end of the pipe 300 may be joined by welding. Further, the second flange 210 and the other end of the pipe 300 may be joined by welding or any other similar way of joining the parts depending on various factors.

Further, the flange 110 may be welded to plural places along a circumferential direction of a tip portion of the one end of the pipe 300. Here, as the welding, arc welding may be used.

In particular, the welding may be made by controlling the number of welded portions so that a fracture load of the welded portion is larger than a shear deformation load by which the first flange 110 and the pipe 300 are shear-deformed.

That is, when an external impact load exceeds a welding fracture load at the time of the crash of vehicles, crash energy is primarily absorbed while the welded portion is separated. Next, the crash energy is secondarily absorbed while the portions of the first flange 110 and the pipe 300 which are deformed in a shape matched with each other to be coupled with each other are shear-deformed, thereby greatly improving absorption performance of the crash energy.

Further, the crash box is configured of only the first plate 100, the second plate 200, and the pipe 300 and therefore the number of parts required to manufacture the crash box may be minimized, thereby reducing cost and weight.

According to an exemplary embodiment of the present invention, the first flange 110 and the second flange 210 are each protrudedly formed at middle ends of the first plate 100 and the second plate 200 by burring and thus the middle ends of the first plate 100 and the second plate 200 are formed in perforated shape.

Further, the first flange 110, the second flange 210, and the pipe 300 may be formed to have a section in a circular shape or an oval shape but may have various other shapes depending on various factors.

That is, the first flange 110 and the second flange 210 are formed by performing the burring on the first plate 100 and the second plate 200, such that machinability of the first flange 110 and the second flange 210 may be improved and the weight of parts may be reduced.

Figure 2:
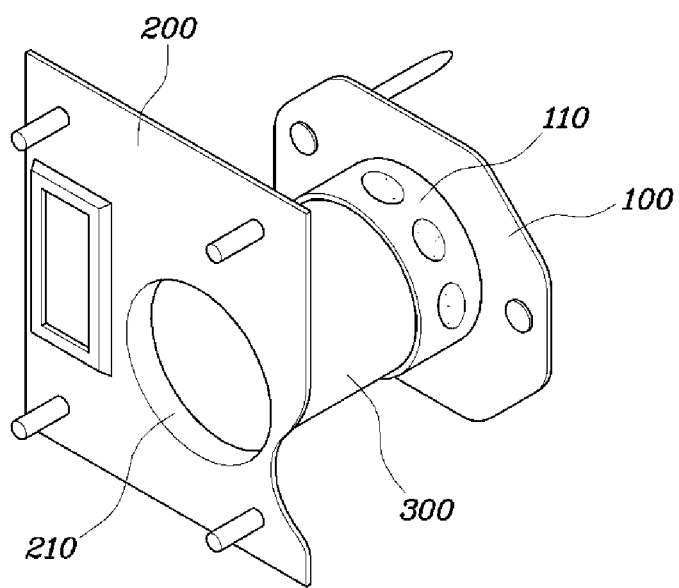
FIG. 2 is a perspective view illustrating a structure of an exemplary crash box for a vehicle according to the present invention.
Figure 3:
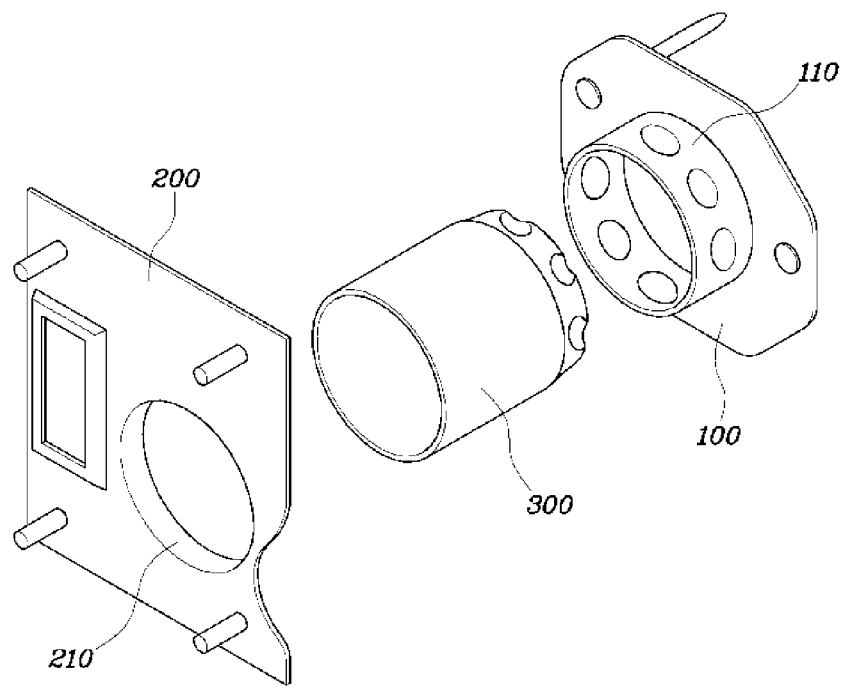
FIG. 3 is an exploded view illustrating a state in which the exemplary crash box for the vehicle is separated according to the present invention.

According to various exemplary embodiments of the present invention, an inner surface of the first flange 110 may be overlappingly coupled to an outer surface of the one end of the pipe 300 and an outer surface of the second flange 210 may be overlappingly coupled to an inner surface of the other end of the pipe 300 as shown in FIG. 2.

In this configuration, the first plate 100 may be coupled to a vehicle body and the second plate 200 may be coupled to a back beam.

That is, the pipe 300 is inserted into the outer surface of the second flange 210 and thus at the time of the crash of vehicles, an impact load transferred from a bumper is transferred to the pipe 300 through the second plate 200 and then an impact force is transferred to a portion of the pipe 300, connected to the first flange 110 through the pipe 300, thereby absorbing the crash energy.

Figure 4A:
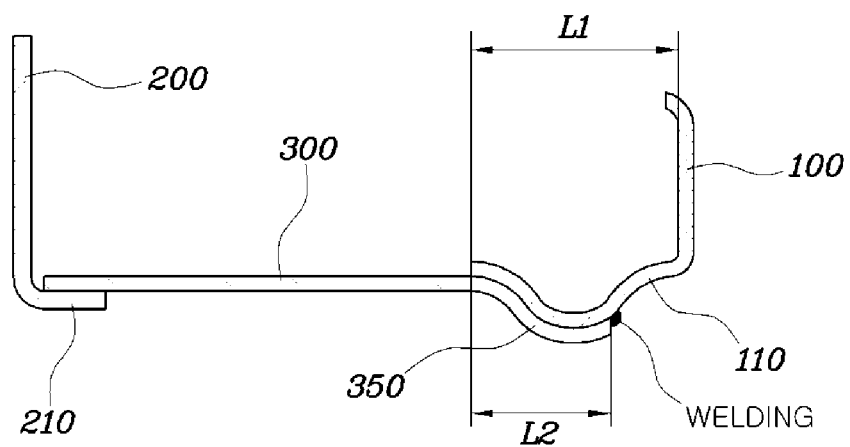
FIGS. 4A and 4B are views illustrating a section structure of the exemplary crash box for the vehicle according to the present invention.
Figure 4B:
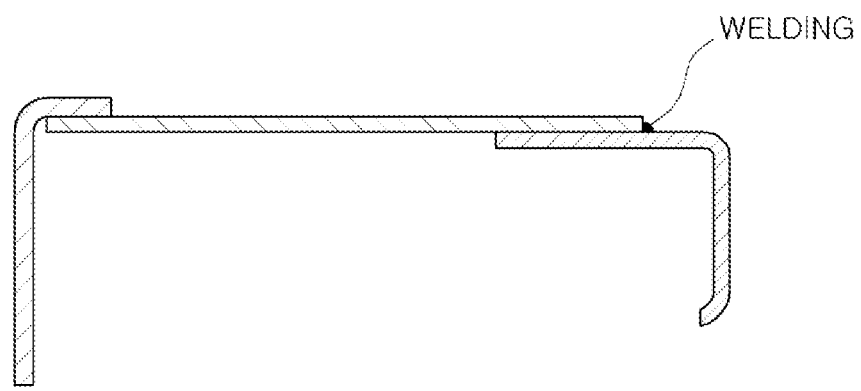

According to various exemplary embodiments of the present invention, the outer surface of the first flange 110 may be overlappingly coupled to the inner surface of the one end of the pipe 300 and an inner surface of the second flange 210 may be overlappingly coupled to the outer surface of the other end of the pipe 300 as shown in FIG. 4A.

Meanwhile, according to various exemplary embodiments of the present invention, the impact absorbing device partially presses the overlapping portion of the first flange 110 and the one end of the pipe 300 along the circumferential direction of the first flange 110. In an exemplary embodiment of the present invention, the impact absorbing device may include an embossing 350 formed at an end of the pipe 300. Accordingly the first flange 110 and the one end of the pipe 300 at the pressed portion may be deformed while being matched with each other in an embossed shape.

In detail, the embossing 350 may protrude in an axial direction of the pipe 300 and an end of the first flange 110 may be matched into the inner surface of the embossing 350 of the pipe 300.

That is, the pressed portion of the pipe 300 and the first flange 110 protrudes toward a center of the pipe 300 while the pipe 300 and the one end of the first flange 110 are matched in the embossed shape and thus when the pipe 300 is pushed in an axial direction by the impact load at the time of the crash of vehicles, the crash energy is absorbed while the first flange 110 and the pipe 300 are shear-deformed at the embossed portion matched by the impact load.

Further, according to various exemplary embodiments of the present invention, an overlapping length L2 of the first flange 110 and the one end of the pipe 300 may be set to be about 70% of a length L1 of the first flange 110 protruding from the middle end of the first plate 100. This amount may additionally be varied depending on circumstances.

According to various exemplary embodiments of the present invention, when the external impact load exceeds the welding fracture load at the time of the crash of vehicles, the first flange 110 and the pipe 300 portion may primarily absorb the crash energy by separating the welded portion therebetween and then the first flange 110 and the pipe 300 portion coupled with each other while being deformed in the shape matched with each other may secondarily absorb the crash energy while the first flange and the pipe portion are shear-deformed, thereby greatly improving the absorption performance of the crash energy.

Further, the crash box is configured only of the first plate, the second plate, and the pipe, and as a result the number of parts required to manufacture the crash box is minimized, thereby reducing the cost and weight.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crash box for a vehicle, comprising:
   a first plate having a middle end formed with a cylindrical first flange protruding in one direction;
   a second plate having a middle end formed with a cylindrical second flange protruding in another direction;
   a pipe having each of both ends coupled to the corresponding first and second flanges respectively; and
   an impact absorbing device configured to absorb an impact while the first flange and the pipe matched with each other through the impact absorbing device are shear-deformed at a time of crash by pressing an overlapping portion of the first flange and one end of the pipe to deform shapes of a pressed portion of the first flange and the pipe into shapes matched with each other.

2. The crash box for the vehicle of claim 1, wherein the first flange and the second flange are each protrudedly formed at middle ends of the first plate and the second plate by burring and the middle ends of the first plate and the second plate have a perforated shape.

3. The crash box for the vehicle of claim 1, wherein an inner surface of the first flange is overlappingly coupled to an outer surface of the one end of the pipe, and an outer surface of the second flange is overlappingly coupled to an inner surface of another end of the pipe.

4. The crash box for the vehicle of claim 1, wherein the first flange, the second flange, and the pipe each have a section in a circular shape or an oval shape.

5. The crash box for the vehicle of claim 1, wherein the impact absorbing device includes an embossing formed on the one end of the pipe and an end of the first flange is matched with the embossing of the pipe such that the impact absorbing device presses a portion of the first flange overlapped with the embodying, along a circumferential direction of the first flange and thus the first flange and the one end of the pipe of the pressed portion are deformed while being matched to each other through the embossing.

6. The crash box for the vehicle of claim 5, wherein the embossing protrudes in an axial direction of the pipe.

7. The crash box for the vehicle of claim 5, wherein an overlapping length of the first flange and the one end of the pipe is set to be about 70% of a length of the first flange protruding from the middle end of the first plate.

8. The crash box for the vehicle of claim 1, wherein the first flange and the one end of the pipe are joined by welding.

9. The crash box for the vehicle of claim 8, wherein the flange is welded to plural places along a circumferential direction of a tip portion of the one end of the pipe.

10. The crash box for the vehicle of claim 9, wherein the welding is made by controlling the number of welded portions so that a fracture load of a welded portion is larger than a shear deformation load by which the first flange and the pipe are shear-deformed.

11. The crash box for the vehicle of claim 1,
    wherein an outer surface of the first flange is overlappingly coupled to an inner surface of the one end of the pipe, and
    wherein an inner surface of the second flange is overlappingly coupled to an outer surface of another end of the pipe.

* * * * *